US009224162B2

(12) United States Patent
Browne et al.

(10) Patent No.: US 9,224,162 B2
(45) Date of Patent: Dec. 29, 2015

(54) BILLING GATEWAY CHARGE METHOD AND SYSTEM

(71) Applicant: Boku, Inc., San Francisco, CA (US)

(72) Inventors: John P. Browne, Larkspur, CA (US); Pankhudi Pankhudi, San Francisco, CA (US); James C. McIntyre, San Francisco, CA (US); Marcin L. Pawlowski, Dublin, CA (US); Teerawat Vilaisakulyong, Berkeley, CA (US)

(73) Assignee: Boku, Inc., San Francisco, CA (US)

( * ) Notice: Subject to any disclaimer, the term of this patent is extended or adjusted under 35 U.S.C. 154(b) by 281 days.

(21) Appl. No.: 13/873,068

(22) Filed: Apr. 29, 2013

(65) Prior Publication Data
US 2014/0323082 A1    Oct. 30, 2014

(51) Int. Cl.
*H04W 4/24* (2009.01)
*G06Q 30/04* (2012.01)

(52) U.S. Cl.
CPC ...................... *G06Q 30/04* (2013.01)

(58) Field of Classification Search
CPC ........... H04W 4/24; H04W 4/14; H04W 4/18; H04W 88/02
USPC .......................................... 455/406, 407, 408
See application file for complete search history.

(56) References Cited

U.S. PATENT DOCUMENTS

| | | | | |
|---|---|---|---|---|
| 2006/0149644 A1* | 7/2006 | Sulmar | ................. | G06Q 20/102 705/34 |
| 2007/0105536 A1* | 5/2007 | Tingo, Jr. | ............... | G06Q 30/02 455/414.1 |
| 2009/0017847 A1* | 1/2009 | Mendiola | ................. | H04W 4/14 455/466 |
| 2010/0030651 A1* | 2/2010 | Matotek | ............... | G06Q 20/105 705/17 |
| 2010/0299212 A1 | 11/2010 | Graylin et al. | | |
| 2011/0022522 A1* | 1/2011 | Sege | ...................... | G06Q 20/32 705/75 |
| 2011/0125610 A1* | 5/2011 | Goodsall | ................ | G06Q 20/12 705/27.1 |
| 2011/0136516 A1* | 6/2011 | Ellis | ........................ | H04W 4/14 455/458 |
| 2011/0275346 A1* | 11/2011 | Fraser | .................... | G06Q 30/02 455/408 |
| 2012/0041870 A1 | 2/2012 | Baskerville | | |
| 2012/0095905 A1 | 4/2012 | Hodges | | |
| 2012/0203667 A1 | 8/2012 | Brody et al. | | |
| 2012/0282891 A1 | 11/2012 | Mohammed et al. | | |

OTHER PUBLICATIONS

International Search Report and Written Opinion mailed on Nov. 14, 2014, for International Patent Application No. PCT/US2014/035728 with International Filing Date of Apr. 28, 2014, (14 pages).

(Continued)

*Primary Examiner* — Christopher M Brandt
(74) *Attorney, Agent, or Firm* — Stephen M. De Klerk

(57) ABSTRACT

The billing gateway charge method and system are disclosed. A charge is processed by receiving a charge API call from a merchant server, detecting a select carrier server from a plurality of servers, transmitting a charge request to the select carrier server, and returning a charge result callback notification to the merchant server. If the charge request fails, the merchant server can submit a new request and an indication of acceptance and failure of the charge request is returned to the merchant server based on the new requests provided that the new request has a new request-id. A continue method allows for managing consumer opt-in in order to complete a transaction. Once the transaction is completed, a refund request from the merchant server can be processed by transmission to the carrier server.

20 Claims, 9 Drawing Sheets

(56) References Cited

OTHER PUBLICATIONS

Written Opinion of the International Preliminary Examining Authority dated May 15, 2015, International Patent Application No. PCT/US14/335729 with International Filing Date of Apr. 28, 2014, (3 Pages).

* cited by examiner

BILLING GATEWAY CHARGE METHOD AND SYSTEM

BACKGROUND OF THE INVENTION

1). Field of the Invention

This invention relates to a system and method of processing a charge.

2). Discussion of Related Art

A consumer who shops for goods or services online may often be given the option to use a selection of payment sources during checkout, such as payment by credit card, debit card, payment from an account held by an institution, or to charge for a purchase on a mobile phone bill. When a consumer selects a charge to their phone bill, a merchant server instructs a billing server which is aligned with a carrier server to carry out the charge. The billing server usually communicates with a consumer mobile phone to confirm the charge before placing the charge on the phone bill at the carrier server.

The billing server may have to communicate with multiple merchant servers and multiple carrier servers. Because of unique communication requirements of each separate merchant server, additional merchant-specific code may have to be created and uploaded at the billing server each time that another merchant server is added to allow for such unique communication. This code will have to be added simply in order to process a charge, although more code will have to be added that is specific to the new merchant server in order to process charges that fail, control consumer opt-in, identify carriers, process refunds, etc.

SUMMARY OF THE INVENTION

The invention provides a method of processing a charge including receiving, with a billing server, a charge API call from a merchant server, including a msisdn and an amount, determining, with the billing server, a select carrier server from a plurality of carrier servers, transmitting, with the billing server, a charge request to the select carrier server, including the msisdn and amount and returning, with the billing server, a chargeresult callback notification to the merchant server, including an indication of acceptance or failure of the charge request.

The invention also provides a non-transitory computer-readable medium having stored thereon a set of instructions which, when executed by a processor of a computer performs a method of processing a charge including receiving, with a billing server, a charge API call from a merchant server, including a msisdn and an amount, determining, with the billing server, a select carrier server from a plurality of carrier servers, transmitting, with the billing server, a charge request to the select carrier server, including the msisdn and amount and returning, with the billing server, a chargeresult callback notification to the merchant server, including an indication of acceptance or failure of the charge request.

The invention further provides a billing computer system including a processor, a computer-readable medium connected to the processor and a set of instructions on the computer-readable medium. The set of instructions includes a carrier billing module, executable with the processor, to receive a charge API call from a merchant server, including a msisdn and an amount, to determine a select carrier server from a plurality of carrier servers, to transmit a charge request to the select carrier server, including the msisdn and amount, and to return a chargeresult callback notification to the merchant server, including an indication of acceptance or failure of the charge request.

BRIEF DESCRIPTION OF THE DRAWINGS

The invention is further described by way of example with reference to the accompanying drawings, wherein:

FIG. 2 is a flowchart illustrating two modes that the system can operate in;

DETAILED DESCRIPTION OF THE INVENTION

Figure 1:
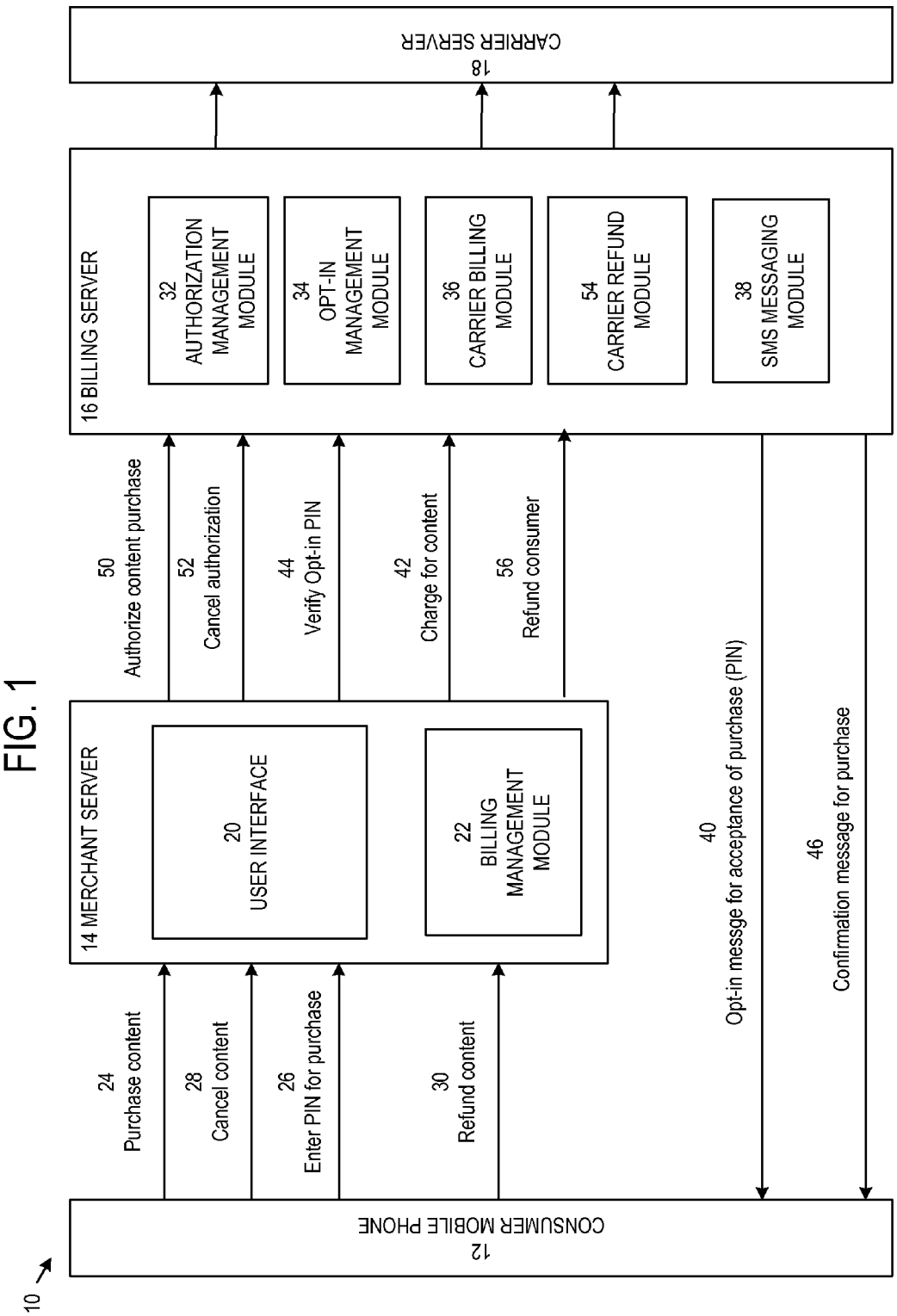
FIG. 1 is a block diagram of a dual mode billing system according to an embodiment of the invention.

FIG. 1 of the accompanying drawings illustrates a dual mode billing system 10, according to an embodiment of the invention, including a consumer mobile phone 12, a merchant server 14, a billing server 16, and carrier server 18.

The merchant server 14 includes a user interface 20 and a billing management module 22. The user interface 20 allows for a consumer using the consumer mobile phone 12 or other consumer devices to make a purchase through an online store on the merchant server 14. During such a purchase, the consumer may at 24 purchase content. In a charge-and-continue mode of the system 10, the consumer may at 26 be required to enter a personal identification number (PIN) for the purchase. In an authorize-and-capture mode of the system 10, the consumer may at 28 cancel the purchase after it has been authorized, but before it has been captured. The consumer may also at 30 request a refund of an earlier purchase that has been completed.

The billing server 16 includes an authorization management module 32, an opt-in management module 34, a carrier billing module 36 and an SMS messaging module 38. Communications between the merchant server 14 and the billing server 16 are primarily accomplished by the billing management module 22 of the merchant server 14 and the authorization management module 32 and opt-in management module 34 of the billing server 14.

The opt-in management module 34 is used in the charge-and-continue method to determine whether an opt-in from a consumer is required. The SMS messaging module 38 is connected to the opt-in management module 34 and at 40 sends a short message service (SMS) text message to the consumer mobile phone 12 with an opt-in message for acceptance of a purchase and including a PIN for the consumer to enter on the user interface 20 while using the consumer mobile phone 12. The opt-in management module 34 typically responds to a signal received at 42 from the billing management module 22 requesting a charge for content. After the consumer enters the PIN code, the billing management module 22 at 44 submits the PIN code to the opt-in management module 34. The opt-in management module 34 then communicates with the carrier billing module 36 which transmits a charge to the carrier server 18. Once the charge has been confirmed by the carrier server 18 back to the billing server 16, the SMS messaging module 38 at 46 transmits a text message to the consumer mobile phone 12 with a confirmation of the purchase.

In the authorize-and-capture mode of the system 10, the merchant server 14 at 50 transmits an authorization request to the authorization management module 32. The authorization management module 32 then transmits an authorization request to the carrier server 18. The effect of the authorization request is that the carrier server 18 will reserve funds for the purchase, but the purchase will not be completed until it has been captured.

The transaction may also be cancelled at the carrier server 18 after it has been authorized and before it has been captured. When the consumer, at 28, requests that the purchase be cancelled, the billing management module 22 at 52 transmits a cancel request to the authorization management module 32. The authorization management module 32 then transmits a cancel request to the carrier server 18 to release the funds that have been set aside for the purchase.

If the consumer does not cancel the purchase, the merchant sends a capture request to the billing server, referencing a previous authorization by means of an authorization-id returned by the billing server, to capture the funds (charge the consumer) that were authorized. The authorization management module 32 then communicates with the carrier billing module 36 which transmits a charge to the carrier server 18. Once the charge has been confirmed by the carrier server 18 back to the billing server 16, the SMS messaging module 38 at 46 transmits a text message to the consumer mobile phone 12 with a confirmation of the purchase.

The billing server 16 further includes a carrier refund module 54. When the consumer at 30 requests a refund of an earlier purchase via the merchant server 14, the billing management module 22 at 56 sends a refund request to the carrier refund module 54. The carrier refund module 54 then communicates with the carrier server 18 for the refund, effectively causing the carrier server 18 to add funds to an account corresponding to the phone number of the consumer mobile phone 12 on the carrier server 18. The carrier refund module 54 communicates with the billing server to send a notification to the merchant server to indicate the success or failure of the refund.

The billing server 16 includes a number of dedicated URL's that are all different. Each one of the uniform resource locators (URL's) allows for a separate application programmable interface (API) call from the merchant server 14 to be made to the billing server 16. The requests at 42, 44, 50, 52 and 56 made by the merchant server 14 to the billing server 16 are all separate API calls to the separate dedicated URL's of the billing server 16. Although not shown, the billing server 16 communicates back with the merchant server 14 following each request by the merchant server 14 to the billing server 16. When the billing server 16 communicates with the merchant server 14, it does so through a URL that has been designated at the merchant server 14 for that purpose. The billing server 16 has a portal (not shown) that an operator of the merchant server 14 can use to configure the callback URL's that the billing server 16 should use in order to communicate with the merchant server 14.

Figure 2:
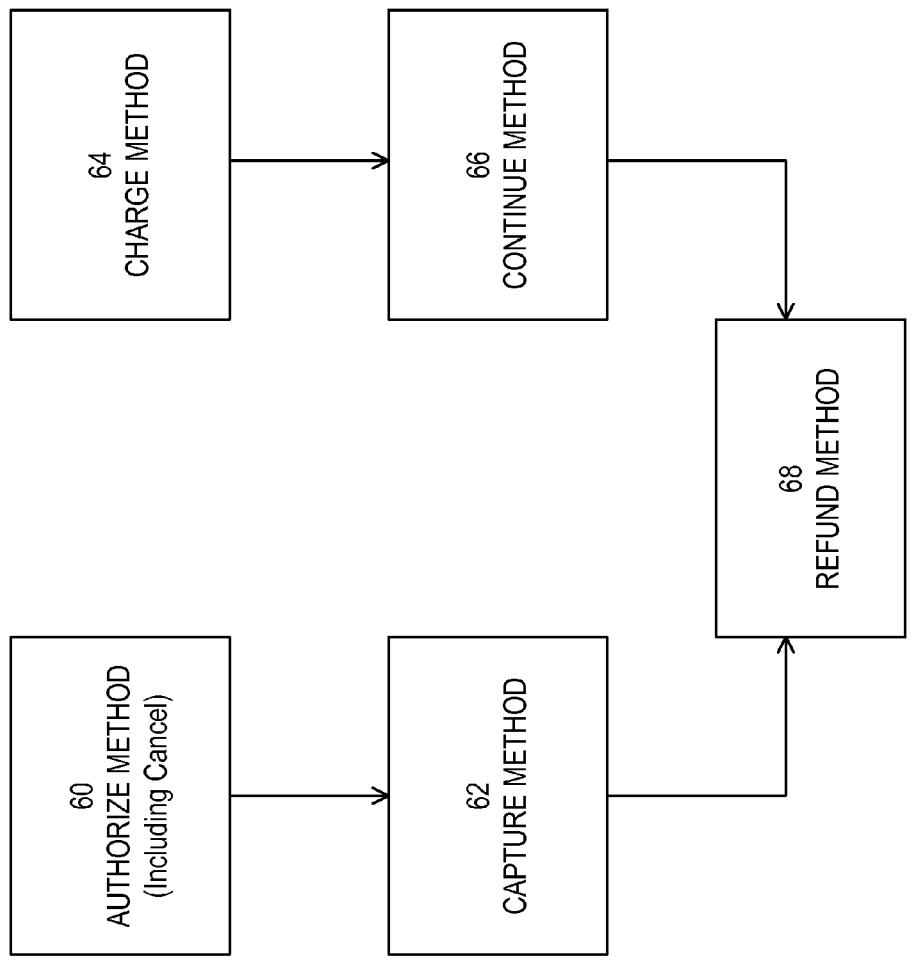

FIG. 2 illustrates the two modes of operation of the system 10. At 60, the system 10 operates in an authorize mode by carrying out an authorize method. In the authorize mode the system 10 authorizes a transaction and reserves funds for the transaction without actually charging for the transaction. While in the authorize mode the possibility still exists for the transaction to be cancelled. At 62 the system 10 operates a capture method wherein the authorized transaction is captured as a charge if it has not been cancelled yet.

At 64 the system 10 operates in a charge mode by carrying out a charge method. The charge method 64 may result in a charge being placed for a transaction. If the opt-in management module 34 determines that an opt-in is required by a consumer, the billing server 16 returns a response to the merchant server 14 indicating that an opt-in must be collected from the consumer before the charge request can be processed. The response from the billing server 16 indicates the type of opt-in that is required for the consumer's country and carrier. If the opt-in requires that the consumer enter a PIN code, received by the consumer from the SMS messaging module 38 of the billing server 16, then the merchant server 14 must collect the PIN code from the consumer at the consumer mobile phone 12 and return the PIN code to the billing server 16 using the continue method. The billing server 16 validates the PIN code and then proceeds to complete the charge request by sending the charge request to the carrier server 18.

The authorize-and-capture method shown at 60 and 62 and the charge-and-continue method shown at 64 and 66 both result in a completed charge. The charge can be reversed when the system 10 carries out a refund method at 68. The refund method 68 allows for a full or partial refund of the amount of the transaction.

The authorize method authorizes a payment from a consumer. When possible, an authorize call should result in the reservation of funds from the user's account at the carrier server 18, not an actual charge. The request may also include an external-id to link to a transaction in the merchant server 14.

The authorize request is a synchronous request. The request blocks while a request is made to the carrier server 18 to complete the authorization. This is done to support use cases wherein the merchant server 14 uses the authorization as a means to grant the consumer access to content or a service. If the authorization is successful the merchant server 14 provides the content or service. In this use case, typically the merchant server 14 will allow the consumer to cancel the service within a specified time period, in which case the merchant server 14 will not capture the authorization. Otherwise, if the consumer does not cancel, the merchant server 14 captures the authorization to charge the consumer.

Authorization includes limit checks (spend and velocity) by both the billing server 14 and the carrier server 18. The ability to reserve funds and the duration of the reservation will vary by carrier server 18.

Figure 3:
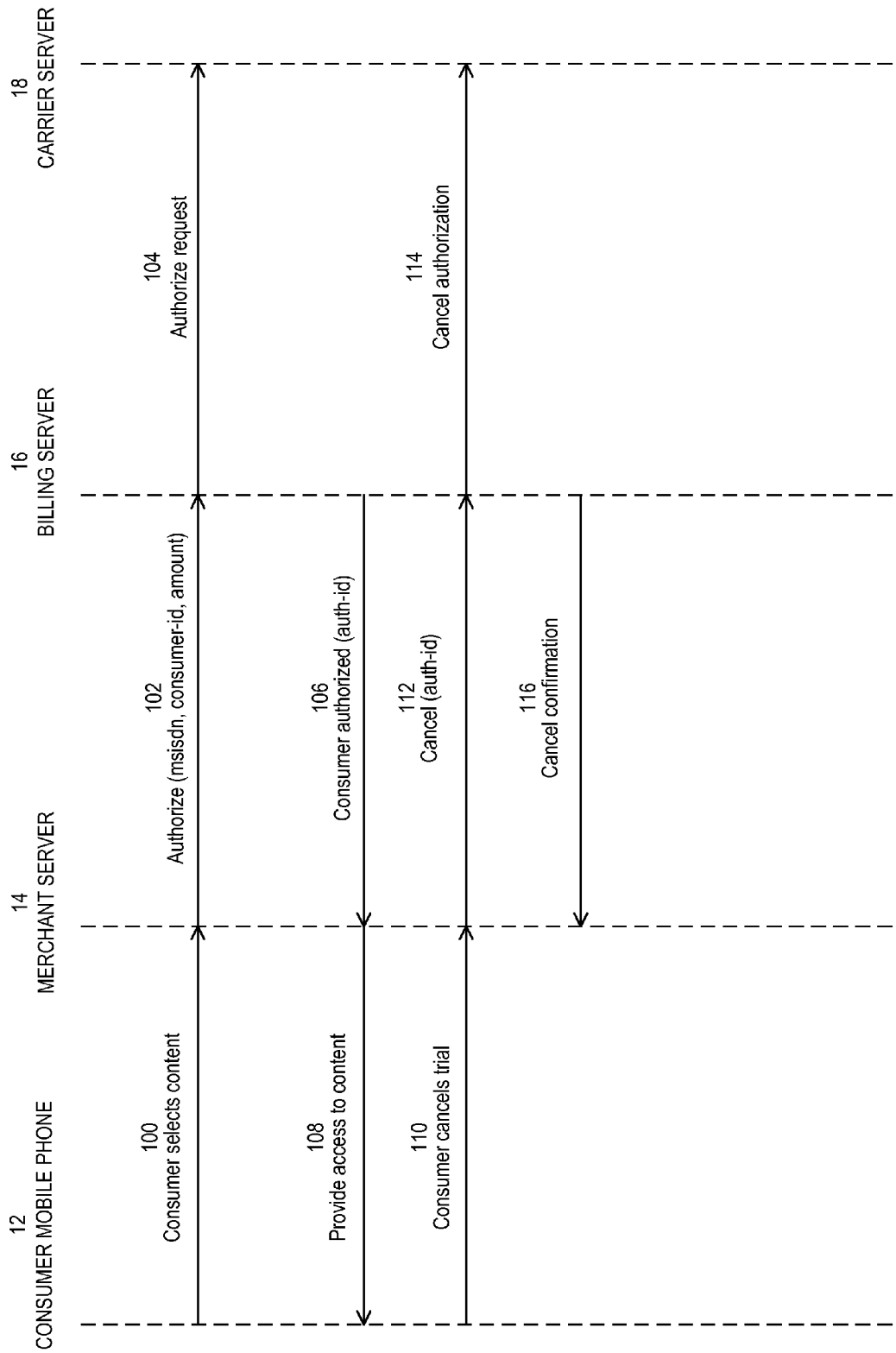
FIG. 3 is an interactive diagram illustrating an authorize method for the example where authorization is cancelled before it is has become a captured transaction.

FIG. 3 illustrates the authorize method for the example where the authorization is cancelled before it is captured to become a captured transaction. At 100, the consumer at the consumer mobile phone 12 selects content to purchase from merchant server 14. The consumer also selects payment by phone. At 102, the merchant server 14 sends an authorize API call including an authorize request to a dedicated authorize URL of the billing server 16. The billing server 16 at 104 sends an authorize request to carrier server 18 and at 106 returns a result of authorization to the merchant server 14. If authorization was successful, the merchant server 14 at 108 grants access to content. At 110, the assumption is made that the consumer cancels the transaction, e.g. before the end of a trial period. If the merchant server 14 does not subsequently capture the authorization then the merchant server 14 will at 112 send a cancel request to the billing server 16 to cancel the outstanding authorization. At 114, the billing server 16 notifies the carrier server 18 to cancel the authorization. At 116, the billing server 16 responds to the cancel request at 112 with a cancel confirmation.

The billing server 16 updates a data structure with the billing server 16 after every operation in FIG. 3. The transaction is first recorded after 102 as authorized and not cancelled and not captured. After 112, the transaction is updated to reflect that it has been cancelled. The data structure either permits or disallows later capture of the transaction.

A request-id must be supplied. The request-id identifies a unique transactional event from the calling system. If the merchant server 14 issues two requests with the same request-id, both requests should return the same reply to the merchant server (assuming the data on both requests is identical). If a request-id is supplied that has been used previously and the data on the request is different from the previous request, the billing server 16 will return an error for the latter request. As such, in the case that a calling system sends multiple capture requests to the billing server 16 using the same request-id, with identical data, the billing server 16 will reply 'Capture Successful' to each request but capture the funds only once.

Tables 1 and 2 show request and response parameters for the authorization request at 102 and the authorization at 106 respectively.

TABLE 1

| Parameter | Type | Description | Required |
|---|---|---|---|
| msisdn | String | Subscriber phone number. In international msisdn format: country code + phone number, numeric only. | Yes |
| merchant-id | String | Billing server assigned merchant ID. | Yes |
| consumer-id | String | Merchant server provided unique consumer identifier. | No |
| consumer-ip-address | String | IP address of the originating consumer; used for risk checks. If it cannot be obtained submit 'NOT_AVAILABLE'. | Yes |
| service-id | String | Merchant server offering ID. | Yes |
| end-merchant-id | String | Billing server assigned merchant ID for an end merchant server submitting transactions through a reseller. | Yes (if reseller) |
| country | String | Country code in ISO 3166-1-alpha-2 standard. | Yes |
| currency | String | ISO 4217 3 letter currency code. | Yes |
| item-description | String | Description of the item being purchased. | Yes |
| tax-amount | Number | Tax amount. | Yes |
| total-amount | Number | Total amount including tax. The amount to authorize. | Yes |
| mnc | String | Mobile network code (MNC). | No |
| mcc | String | Mobile country code (MCC). | No |
| request-id | String | Merchant server assigned request ID. Must be unique. | Yes |
| external-id | String | External ID supplied by calling system. | No |
| external-item-id | String | Merchant server assigned identifier for the purchased item. | No |
| external-data | String | Merchant server supplied meta data. | No |

TABLE 2

| Parameter | Type | Description | Required |
|---|---|---|---|
| authorization-id | String | Billing server assigned authorization ID (if call is successful). Used in subsequent Capture requests. | Yes |
| result-code | String | The result of this request. | Yes |
| result-message | String | Description of the result. | Yes |
| expiration-date | Time-stamp | Expiration date/time of the authorization. Advisory only and only returned if provided by the carrier server. | No |
| retry-delay | Number | Returned when a retriable error has occurred. Specifies the minimum time the merchant server should wait before retrying the request. (Time in MS). | No |

In a typical authorization flow, the consumer selects a service product on the merchant server 14. The merchant server 14 obtains a phone number and optionally the MNC and MCC of the carrier server 18. The merchant server 14 makes an authorize API call to a dedicated URL of the billing server 16. The authorize API call submits an authorize request to the billing server 16 with the customer identification and purchase details. The billing server 16 validates the request. If the request fails validation, the billing server 16 returns an appropriate error message and does not return an authorization-id. The billing server 16 performs spend limit and velocity checks. If the spend or velocity checks fail or if the msisdn is blacklisted, authorization fails and an appropriate error message is returned. The billing server 16 determines the select carrier server 18 (using supplied MNC/MCC or executes an internal lookup from a plurality of carrier servers in a data store of the billing server 16) and submits an authorization request to the carrier server 18 using their direct API.

If the carrier server 18 only supports charge on authorization then the authorization request will be treated as an authorization-and-capture. The billing server 16 returns the authorization response to the merchant server 14, including an authorization-id that is used in subsequent capture or cancel requests. If the merchant server 14 has supplied an external-id, the external-id is saved with the authorization-id.

If the authorization returns a retriable error, the merchant server 14 retries the authorization request after the specified retry-delay returned in the authorize response.

If the response from the carrier server 18 is that the authorization did not succeed, the billing server 16 returns an indication that authorization failed and closes the request. The billing server 16 sends a final transaction result in a callback.

Once the transaction has been authorized, it is recorded within the billing server 16 as authorized and not captured. A cancel API call includes a cancel request that cancels a previously authorized transaction from a customer, releasing any reserved funds at the carrier server 18. For merchant servers with billing systems that do not support separate authorization-and-capture, this request should result in a refund in the full amount specified in the referenced authorization call.

Tables 3 and 4 show request and response parameters for the cancel signals at 112 and 116, respectively, in FIG. 3.

TABLE 3

| Parameter | Type | Description | Required |
|---|---|---|---|
| merchant-id | String | Billing server assigned merchant ID. | Yes |
| authorization-id | String | Authorization ID returned from the authorization request. | Yes |
| request-id | String | Merchant server assigned request ID. Must be unique. | Yes |

TABLE 4

| Parameter | Type | Description | Required |
|---|---|---|---|
| result-code | String | The result of this request. | Yes |
| result-message | String | Description of the result. | Yes |
| retry-delay | Number | Returned when a retriable error has occurred. Specifies the minimum time the merchant server should wait before retrying the request. | No |

In a typical cancel flow the merchant server 14 submits a cancel request to cancel a previously obtained authorization and supplies the authorization-id of the authorization. The billing server 16 validates the authorization-id and invokes the cancel API for the appropriate carrier server 18. The billing server 16 then returns the result code and message to the carrier server 18 and then sends a final result callback to the carrier server 18 that indicates that the transaction was closed due to canceling the authorization.

Figure 4:
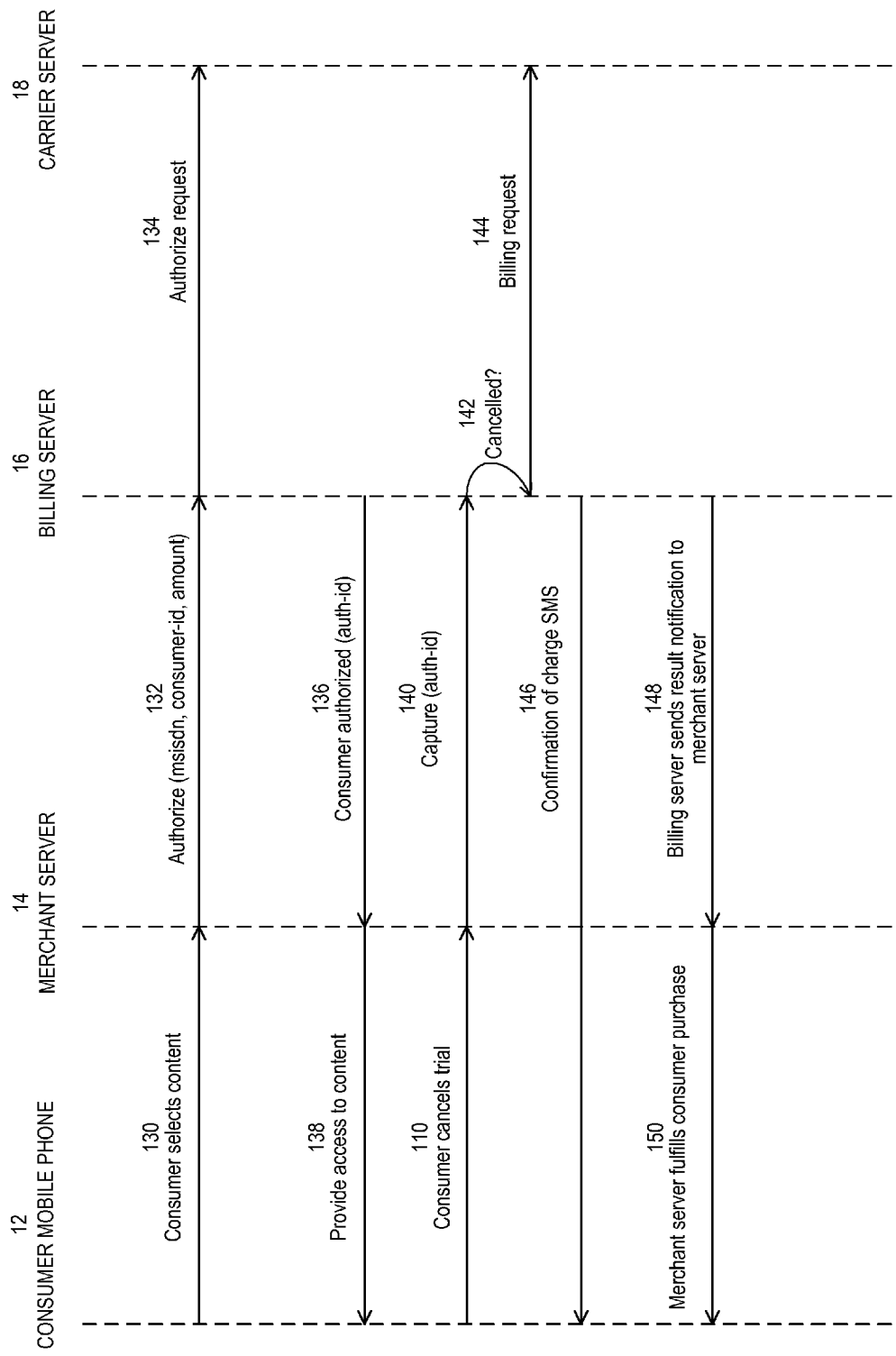
FIG. 4 is an interactive diagram illustrating the authorization method for the example where authorization is not cancelled before it is captured to become a captured transaction.

FIG. 4 illustrates the authorization method for the example where the authorization is not cancelled before it is captured to become a captured transaction and the transaction is then captured. A capture API call includes a capture request that confirms a previously authorized payment from a customer. The capture API call indicates that the customer order has been fulfilled and should result in the actual capture of funds from the customer account at the carrier server 18. If the carrier server 18 does not support separate authorization and capture operations, then this call is advisory. The billing server 16 records the capture event as an indication of fulfillment.

The default behavior is to capture the authorized amount in full. A successful capture closes the transaction (the authorization) whether the capture is for the full amount or for a partial amount. A capture must occur within the time limit of the authorization.

At 130, the consumer at the consumer mobile phone 12 selects content to purchase from merchant server 14. The consumer also selects payment by phone. At 132, the merchant server 14 sends an authorization API call including an authorize request to the dedicated authorize URL of the billing server 16. The billing server 16 at 134 sends an authorize request to the carrier server 18 and at 136 returns a result of the authorization to the merchant server 14 and includes an authorization-id. If authorization was successful, the merchant server 14 at 138 grants access to the content.

At 140, the merchant server 14 sends a capture request to the billing server 16, referencing the authorization-id. At 142 the billing server 16 determines whether the transaction that has been authorized has been cancelled. The billing server 16 will only proceed with the transaction and send a billing request to the carrier server 18 if the transaction has not been cancelled. The capture will thus be disallowed if the authorization has been cancelled. At 144 the billing server 16 transmits a billing request to the carrier server 18 to complete the transaction and charge an account of the consumer on the carrier server 18. At 146 the billing server 16 sends a confirmation text message to the consumer mobile phone 12. At 148 the billing server 16 sends a billing result notification to the merchant server 14. At 150 the merchant server 14 fulfills the consumer purchase if the charge was successful.

Tables 5 and 6 include request and response parameters for the capture signals at 140 and 148, respectively, in FIG. 4.

TABLE 5

| Parameter | Type | Description | Required |
|---|---|---|---|
| merchant-id | String | Billing server assigned merchant ID. | Yes |
| authorization-id | String | Authorization ID returned from the authorization request. | Yes |
| request-id | String | Merchant server assigned request ID. Must be | Yes |
| currency | String | ISO 4217 3 letter currency code. | No |
| tax-amount | Number | Tax amount. | No (required if total-amount is provided) |
| total-amount | Number | Total including tax. | No |
| item-description | String | Description of the item purchased. | No |

TABLE 6

| Parameter | Type | Description | Required |
|---|---|---|---|
| capture-id | String | Unique ID for this capture request. | Yes |
| result-code | String | The result of this request. | Yes |
| result-message | String | Description of the result. | Yes |
| retry-delay | Number | Returned when a retriable error has occurred. Specifies the minimum time the merchant server should wait before retrying the request. | No |

The capture request returns a capture-id that is different from the authorization-id. This authorization-id allows multiple captures against a single authorization. Subsequent refunds can reference the specific capture-id that is being refunded.

If the capture fails due to the authorization timing out or the consumer opt-in expiring, the billing server 16 returns a result code and message indicating the expiration. If the capture fails due to the capture amount exceeding the amount in the authorization, the billing server 16 returns a result code and message indicating the failure due to the amount that is too large and no capture-id is returned. The capture can be retried with the correct amount. If the capture request returns retry error, the billing server 16 returns a result code and message indicating an error and no capture-id is returned and the capture-id can be retried.

Figure 5:
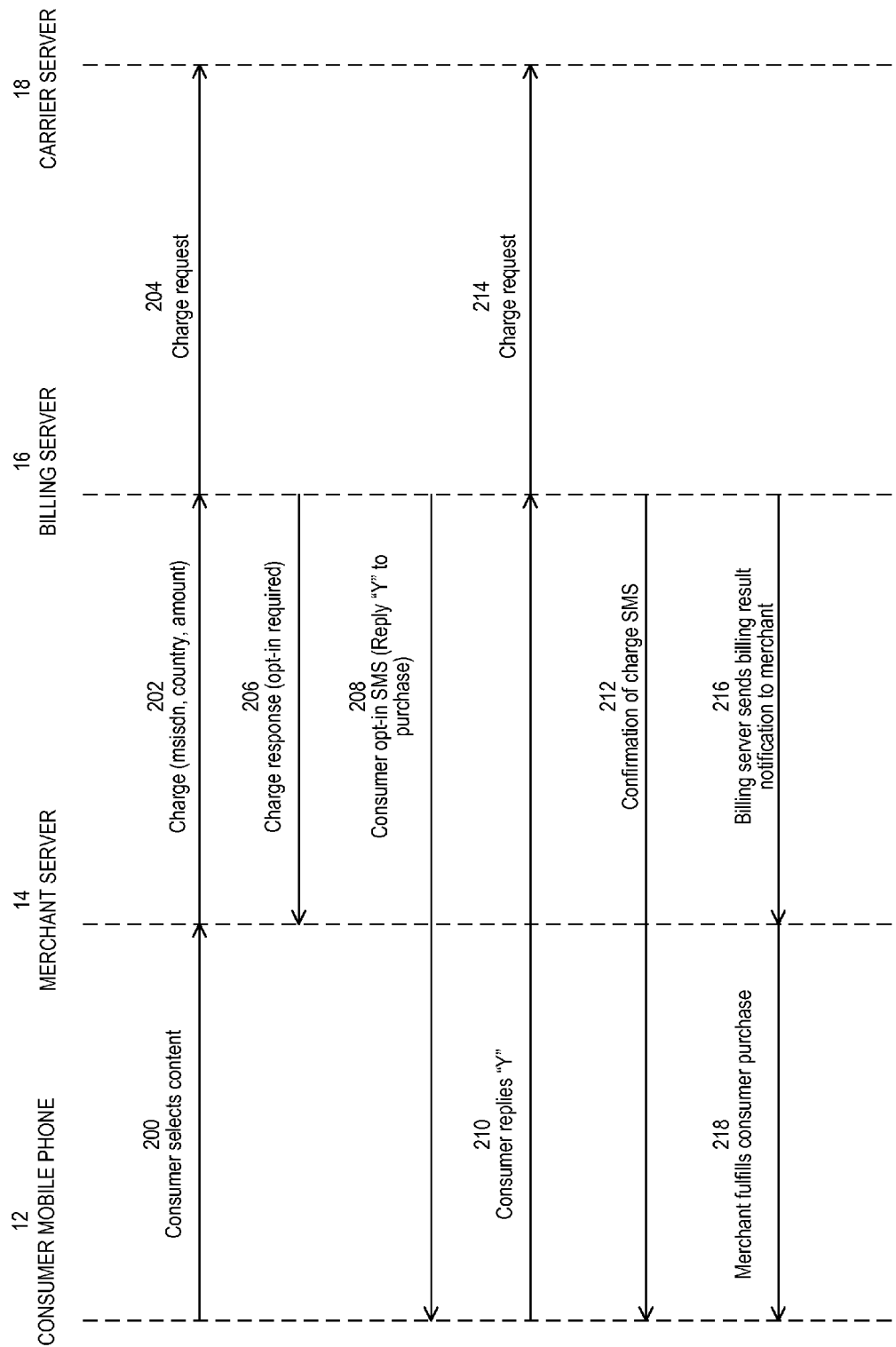
FIG. 5 is an interactive diagram illustrating a charge method for the case where a mobile-ordinated opt-in by a consumer at a consumer mobile phone is performed.

FIG. 5 shows a charge method that can be used in place of a two-step authorize-and-capture transaction method when the authorize-and-charge method is not appropriate. The charge performs the same risk checks as the authorize method. The charge method will also perform consumer authentication (opt-in) if required. The charge method request will return a charge-id if, at the billing server 16, the request is accepted for processing, namely when the request passes validation (field validation, security validation), passes risk check, and is submitted to the carrier server 18 for processing. Once the charge is completed, the billing server 16 sends a callback notification to the merchant server 14 with the final status of the transaction. The billing server 16 can manage consumer opt-in as part of the charge request processing. The billing server 16 will perform any appropriate consumer opt-in flow based on requirements of the particular market and carrier server 18.

The charge method in FIG. 5 illustrates the case where a mobile-originating opt-in by the consumer at the consumer mobile phone 12 is performed. At 200 the consumer selects, at the consumer mobile phone 12, content to purchase from merchant server 14. The consumer also selects payment by phone. At 202 the merchant server 14 makes a charge API call to a dedicated URL of the billing server 16. The charge API call sends a charge request to the billing server 16.

For markets or carrier servers 18 where an opt-in is required, the billing server 16, at 204, sends a charge request to carrier server 18. If the billing server 16 determines that an opt-in is required for the charge the billing server 16 at 206 sends a notification to the merchant server 14 that an opt-in is required and at 208 sends a text message to the consumer mobile phone 12 with instruction to reply 'Y'. The merchant server 14, via the user interface 20, displays to the consumer that they have been sent an SMS message and will need to reply with a specific keyword. At 210 the consumer sends a reply text message with the required keyword to the billing server 16. The billing server 16 verifies the keyword and at 212 sends a confirmation text message to the consumer mobile phone 12. At 214 the billing server 16 sends a charge request to the carrier server 18 and at 216 sends a billing result notification to the merchant server 14. At 218 the merchant server 14 via the user interface 20, displays a confirmation to the consumer that the charge was successful and fulfills the purchase.

The notification that is transmitted at 206 includes the keyword that is displayed by the merchant server 14. The keyword is a unique keyword that is generated by the billing server 16. The keyword received at 210 is validated against the keyword transmitted at 206 and the transaction only proceeds upon a favorable comparison.

Figure 6:
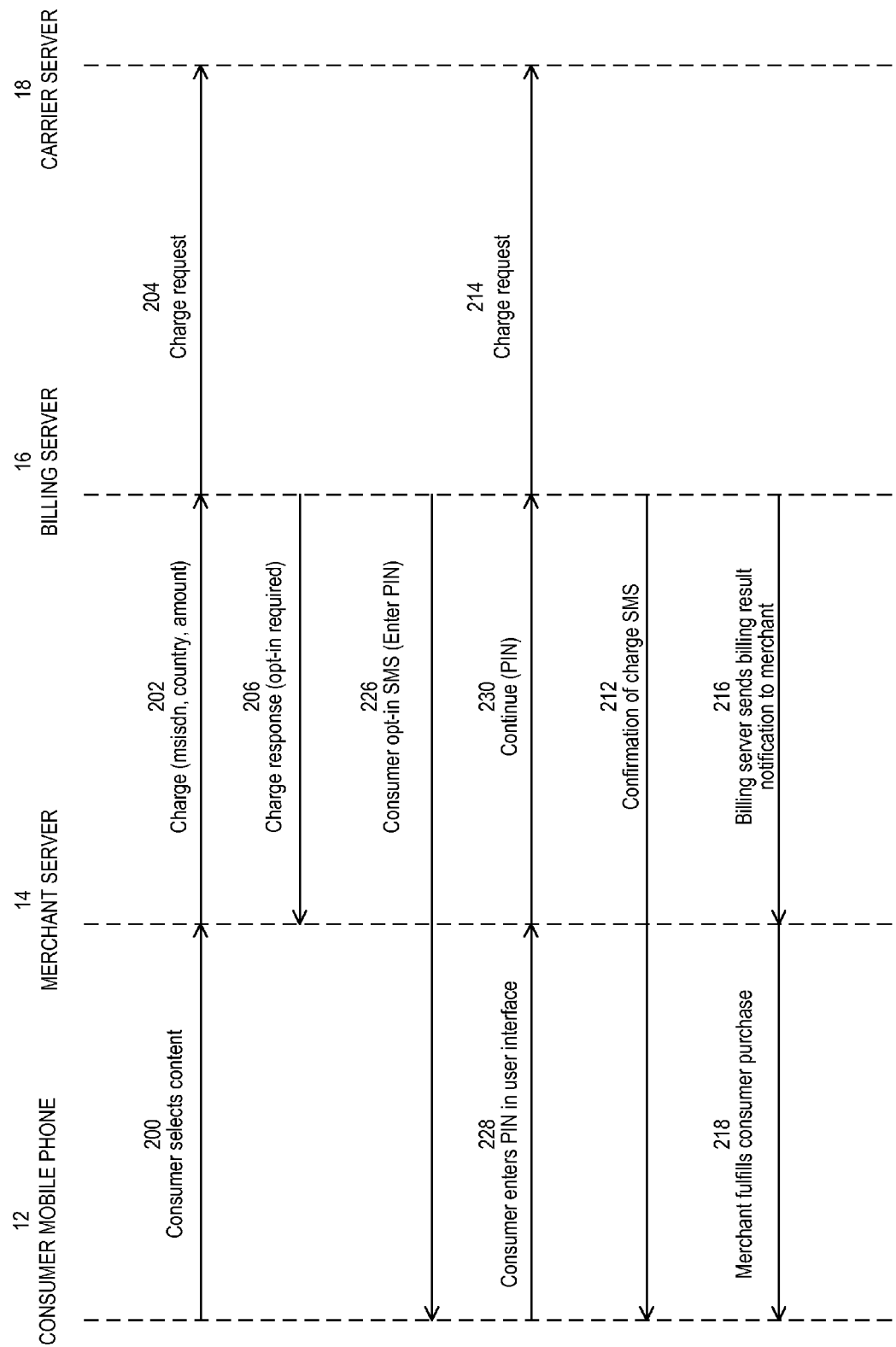
FIG. 6 is an interactive diagram illustrating a charge method for the case where a PIN opt-in by the consumer at the consumer mobile phone is performed.

FIG. 6 illustrates a charge method for the case where a PIN code opt-in by the consumer at the consumer mobile phone 12 is performed. Similar reference numerals are used in FIGS. 5 and 6 for similar transactions. At 200 the consumer selects content to purchase from merchant server 14. The consumer also selects payment by phone. At 202 the merchant server 14 sends a charge request to the billing server 16.

The billing server, at 204, may send a charge request to the carrier server 18 if no opt-in is required by the consumer. If the billing server 16 determines that an opt-in is required for the charge; the billing server 16 at 206 sends a confirmation to the merchant server 14 that an opt-in is required and at 226 sends a text message to the consumer mobile phone 12 with a PIN code. At 228 the consumer at the consumer mobile phone 12 enters the PIN code into a user interface 20 provided by the merchant server 14. At 230 the merchant server 14 sends a continue request to the billing server 16 with PIN code entered by the consumer. The billing server 16 verifies the PIN code and at 212 sends a confirmation text message to the consumer mobile phone 12. At 214 the billing server 16 sends a charge request to the carrier server 18 and at 216 sends a billing result notification to the merchant server 14. At 218 the merchant server 14 displays a confirmation to the consumer that the charge was successful and fulfills the purchase.

The text message that is transmitted at 226 includes a PIN code that is unique and is generated by the billing server 16. The PIN code received at 230 is validated against the PIN code transmitted at 226 and the transaction only proceeds upon a favorable comparison.

Table 7 shows request parameters for the charge request at 202 in FIGS. 5 and 6 and table 8 shows response parameters for the notification at 216 in FIGS. 5 and 6.

TABLE 7

| Parameter | Type | Description | Required |
|---|---|---|---|
| msisdn | String | Subscriber phone number. In international msisdn format: country code + phone number, numeric only. | Yes |
| merchant-id | String | Billing server assigned merchant ID. | Yes |
| consumer-id | String | Merchant server provided unique consumer identifier. | No |
| consumer-ip-address | String | IP address of the originating consumer; user for risk checks. If it cannot be obtained submit 'NOT_AVAILABLE'. | Yes |
| service-id | String | Merchant offering ID. | Yes |
| end-merchant-id | String | Boku assigned merchant ID for an end merchant submitting transactions through a reseller. | Yes (if reseller) |
| country | String | Country code in ISO 3166-1-alpha-2 standard. | Yes |
| currency | String | ISO 4217 3 letter currency code. | Yes |
| tax-amount | Number | Tax amount. | Yes |
| total-amount | Number | Total amount including tax. The amount to authorize. (Value is in fractional units). | Yes |
| mnc | String | Mobile network code (MNC). | No |
| mcc | String | Mobile country code (MCC). | No |
| request-id | String | Merchant server assigned request ID. Must be unique. | Yes |
| external-id | String | External ID supplied by calling system. | No |
| external-item-id | String | Merchant assigned identifier for the purchased item. | No |
| external-data | String | Merchant supplied meta data. | No |
| item-description | String | Description of the item being purchased. | Yes |

TABLE 8

| Parameter | Type | Description | Required |
|---|---|---|---|
| charge-id | String | Billing server assigned charge ID (if the call is accepted). | Yes |
| result-code | String | The result of this request. | Yes |
| request-id | String | Merchant server assigned request ID. Must be unique. | Yes |
| result-message | String | Description of the result. | Yes |
| consumer-auth-required | Boolean | If 'TRUE', consumer will receive a text message on their handset requesting a keyword reply or entry of a PIN. | Yes |
| consumer-auth-type | Enum | PIN, KEYWORD. | No |
| consumer-auth-short-code | String | Short code that consumer must send the keyword to. Merchant server can display to user. | Yes (if KEYWORD) |
| consumer-auth-keyword | String | Keyword that consumer must send to short code. Merchant server can display to user. | Yes (if KEYWORD) |

TABLE 8-continued

| Parameter | Type | Description | Required |
|---|---|---|---|
| retry-delay | Number | Returned when a retriable error has occurred. Specifies the minimum time the merchant server should wait before retrying the request. | No |

In a typical authorization flow, the consumer selects a service product on the merchant server 14. The merchant server 14 obtains a phone number and optionally the MNC and MCC of the carrier server 18. The merchant server 14 makes an authorize API call to a dedicated URL of the billing server 16. The authorize API call submits an authorize request to the billing server 16 with the customer identification and purchase details. The billing server 16 validates the request. If the request fails validation, the billing server 16 returns an appropriate error message and does not return an authorization-id. The billing server 16 performs spend limit and velocity checks. If the spend or velocity checks fail or if the msisdn is blacklisted, authorization fails and an appropriate error message is returned. The billing server 16 determines the select carrier server 18 (using supplied MNC/MCC or executes an internal lookup from a plurality of carrier servers in the data store of the billing server 16) and submits an authorization request to the carrier server 18 using their direct API.

As seen in FIGS. 5 and 6, the continue operation continues a charge request that is awaiting consumer opt-in. A continue call is used in cases where the charge indicates that an additional opt-in needs to be obtained from the customer through either a mobile-originating opt-in in FIG. 5 (Reply with keyword) or PIN code as in FIG. 6 (sent to phone and entered by customer in merchant interface).

In the case of a PIN code entry, the user interface 20 in FIG. 1 should indicate to the consumer to enter the PIN code sent to their phone. The entered PIN code is sent to the billing server 16 on the continue call. A successful return from this call to the merchant server 14 allows the charge request to continue. In either type of opt-in, the billing server 16 will send a callback notification to the merchant server 14 when the transaction is completed, per normal charge request processing.

The merchant server 14 may choose to use a polling approach for consumer opt-ins that require reply with keyword. In this case, the merchant server 14 submits a continue request on a recurring basis (polling) to determine if the consumer reply is successful.

Charges that require a consumer opt-in are placed in a Consumer Confirmation Pending state indicating that the charge has not been completed. If the consumer does not opt-in within a predetermined amount of time the transaction expires and is placed in a final, failed state. The billing server 16 sends a callback to the merchant server 14 that communicates the final status of the transaction.

Tables 9 and 10 show request and response parameters for continue requests between the merchant server 14 and the billing server 16.

TABLE 9

| Parameter | Type | Description | Required |
|---|---|---|---|
| merchant-id | String | Boku assigned merchant account id. | Yes |
| continue-id | String | Boku provided identifier from an authorization or a charge. | Yes |

TABLE 9-continued

| Parameter | Type | Description | Required |
|---|---|---|---|
| pin-code | String | PIN code entered by customer to indicate opt-in for payment. | No (Required if the opt-in is PIN based) |
| request-id | String | Merchant server assigned request ID. Must be unique. | Yes |

TABLE 10

| Parameter | Type | Description | Required |
|---|---|---|---|
| result-code | String | Result of this request. | Yes |
| result-message | String | Description of the result. | Yes |

Figure 7:
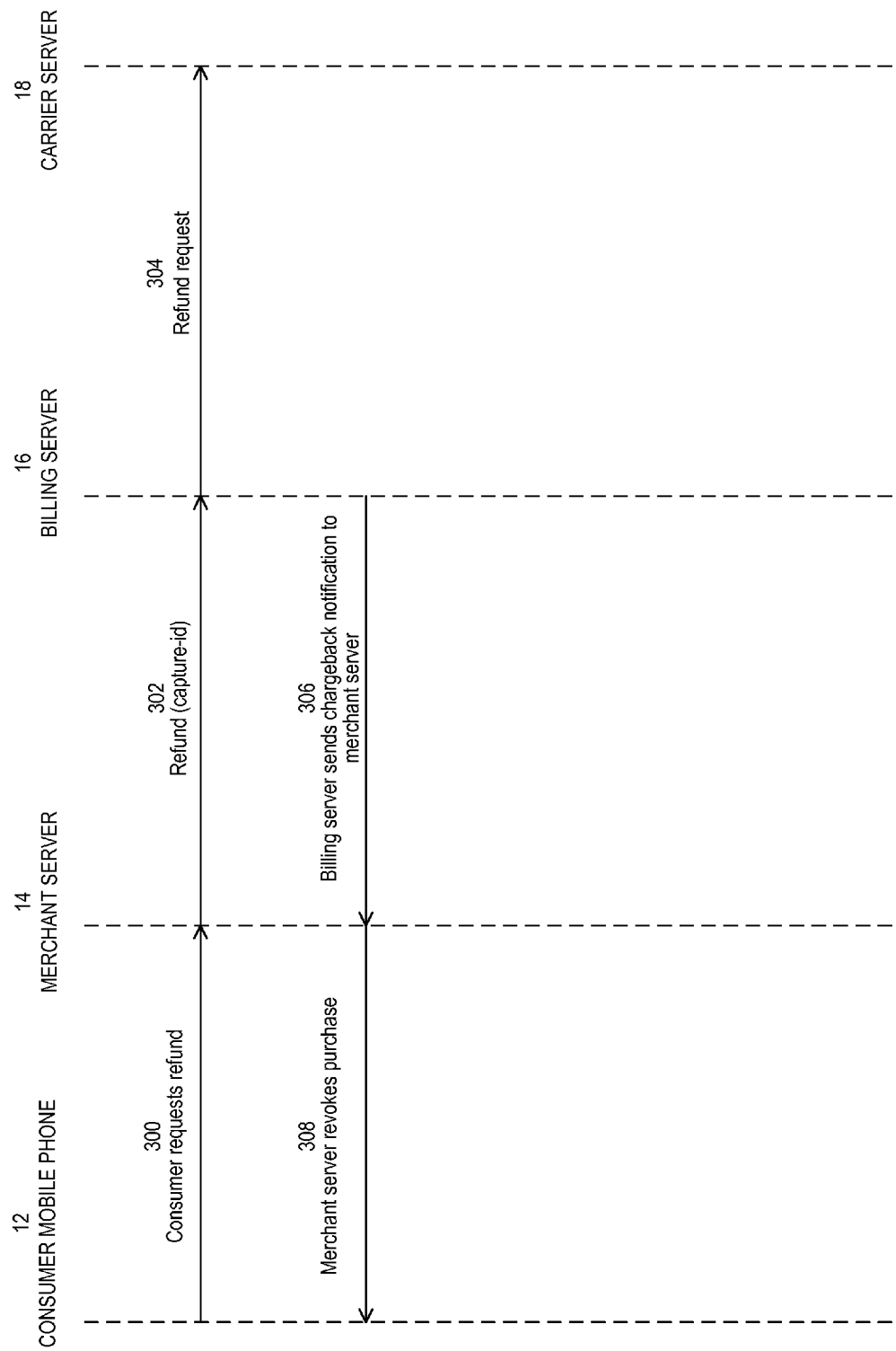
FIG. 7 is an interactive diagram illustrating how a refund is processed after the capture method.

Refunds can be processed after either a captured payment as described with reference to FIG. 3 or after the charge method as described with reference to FIGS. 5 and 6. FIG. 7 illustrates how a refund is processed after the capture method in FIG. 3.

At 300, the consumer at the consumer mobile phone 12 requests refund from merchant server 14 through the user interface 20 in FIG. 1. At 302 the merchant server 14 sends a refund request to the billing server 16 referencing a specific charge by including the capture-id that serves as a transaction identifier. The billing server 16 determines the same select carrier server 18 from the refund call and at 304 sends a refund request to the carrier server 18. The refund request includes the amount of the original transaction to be refunded or a lesser amount in the case of a partial refund. At 306 the billing server 16 sends a chargeback notification to the merchant server 14 indicating the result and amount of the chargeback. At 308 the merchant server 14 revokes the purchase and updates the user account on the merchant server 14 to reflect the refund.

Tables 11 and 12 respectively show request and response parameters for the refund request at 302 and the chargeback notification 306. In the case where the refund is in response to the charge method, the capture-id is replaced with the charge-id.

TABLE 11

| Parameter | Type | Description | Required |
|---|---|---|---|
| merchant-id | String | Billing server assigned merchant ID. | Yes |
| capture-id | String |  | Yes |
| reason-code | String | Billing server refund reason code. | Yes |
| currency | String | ISO 4217 3 letter currency code. | No |
| tax-refund | Number | Tax refund for partial refund. | No |
| total-refund | Number | Total refund amount for partial refund. | No |
| request-id | String | Merchant server assigned request ID. Must be unique. | Yes |

TABLE 12

| Parameter | Type | Description | Required |
|---|---|---|---|
| refund-id | String | ID of the billing server created Refund transaction. | Yes (returned if refund is successful) |
| result-code | String | The result of this request. | Yes |
| retry-delay | Number | Returned when a retriable error has occurred. Specifies the minimum time the merchant server should wait before retrying the request. | No |
| result-message | String | Description of the result. | Yes |

The refund request received at 302 includes a reason code. The billing server 16 determines whether the reason code is a valid reason code and only processes the refund if there is a valid reason code. The billing server 16 then uses the capture-id to determine the original charge and the specific carrier server 18 through which the original charge was processed.

If the refund fails because an invalid reason code is provided or no reason code is provided, the billing server 16 does not return a refund-id and only returns a result code and result message. Similarly, if the refund fails because the refund amount exceeds the amount of referenced transaction, the billing server 16 does not return a refund-id and only returns a result code and result message. In the case where a partial refund is requested by the merchant server 14, the billing server 16 obtains a refund in the partial amount and returns a refund-id, but no further refund can be obtained against that capture-id.

As described above, the billing server 16 provides for performing consumer authentication (opt-in) as required by specific market and carrier server 18 conditions. The billing server 16 managed consumer opt-in is provided for charge requests only. In cases where the billing server 16 manages the opt-in, the billing server 16 will provide a response to a charge request from a merchant server 14 that indicates that consumer opt-in of the payment is required. There are two forms of consumer opt-in: PIN based and reply with keyword. Based on the market and carrier server 18, the billing server 16 will provide the necessary type of opt-in. In the case of a PIN code based opt-in, the merchant server 14 will use the continue request to continue (by submitting the PIN code) once the consumer has entered the PIN in a merchant server 14 provided PIN entry form.

The billing server 16 can also support auto-authentication if the merchant server 14 supplies a unique identifier for the consumer along with their phone number. In this case, the billing server 16 will check to see if a consumer authentication has been previously processed for the consumer within a configurable period of time (other rules may be considered as well). If so, the billing server 16 will accept the prior authentication and not require the consumer to authenticate again.

The following methods support idempotency: authorize, capture, cancel, charge and refund. When an idempotent method is called, the operation is performed only once, even if multiple calls are made. If two charge requests are made for the same request-id, the account is charged only once and both requests get the same reply. If successful, all calls will return the expected success response, but the actual charge will only be made once. All calls to idempotent methods must include a unique value in the request-id parameter.

The billing server 16 API contains both synchronous and asynchronous requests. The authorize request is a synchronous request. The request blocks while a request is made to the carrier server 18 to complete the authorization. A synchronous authorization supports a number of use cases that share the need to provide a response while a user is awaiting access to an application or content.

Capture and charge are asynchronous requests. These requests are received and processed by the billing server 16 and the billing server 16 provides an immediate response that indicates whether the request was accepted or not. An accepted request will return a response to indicate that the request was successfully processed and the response code and message will state that the transaction is in-progress. Once the transaction processing is complete, whether successful or failed, the billing server 16 will send the merchant server 14 a callback notification with the transaction processing details.

The billing server 16 sends Hypertext Transfer Protocol (HTTP) POST requests to designated publisher URLs ("callback URLs") to communicate transaction status information. Callback notifications are asynchronous. A merchant server 14 can configure their callback URL using a publisher portal of the billing server 16. Callback notifications may be necessary for certain use cases such as asynchronous transactions where there are completion and completion of charge and capture requests (successful or failed), and carrier initiated refunds where a notification is received for each refunded transaction received from a carrier server 18.

Figure 8:
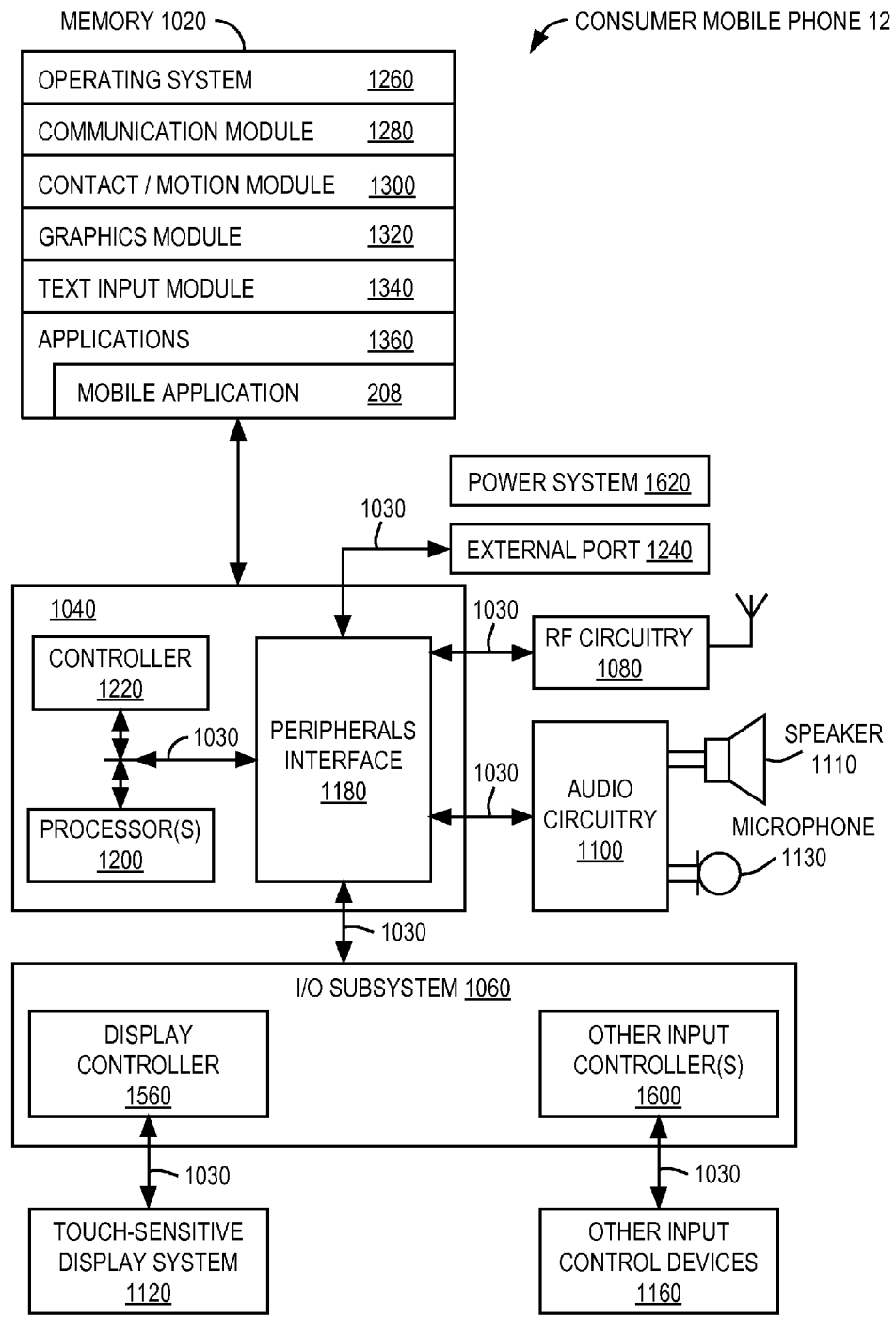
FIG. 8 is a block diagram of the consumer mobile phone illustrating SmartPhone features thereof.

FIG. 8 is a block diagram illustrating the consumer mobile phone 12, illustrating a touch-sensitive display 1120 or a "touch screen" for convenience. The consumer mobile phone 12 includes a memory 1020 (which may include one or more computer readable storage mediums), a memory controller 1220, one or more processing units (CPU's) 1200, a peripherals interface 1180, RF circuitry 1080, audio circuitry 1100, a speaker 1110, a microphone 1130, an input/output (I/O) subsystem 1060, other input or control devices 1160 and an external port 1240. These components communicate over one or more communication buses or signal lines 1030.

The various components shown in FIG. 8 may be implemented in hardware, software or a combination of hardware and software, including one or more signal processing and/or application specific integrated circuits.

The memory 1020 may include high-speed random access memory and may also include non-volatile memory, such as one or more magnetic disk storage devices, flash memory devices, or other non-volatile solid-state memory devices. Access to the memory 1020 by other components of the consumer mobile phone 12, such as the CPU 1200 and the peripherals interface 1180, is controlled by the memory controller 1220.

The peripherals interface 1180 connects the input and output peripherals of the device to the CPU 1200 and memory 1020. The one or more processors 1200 run or execute various software programs and/or sets of instructions stored in the memory 1020 to perform various functions for the consumer mobile phone 12 and to process data.

The RF (radio frequency) circuitry 1080 receives and sends RF signals, also called electromagnetic signals. The RF circuitry 1080 converts electrical signals to/from electromagnetic signals and communicates with communications networks and other communications devices via the electromagnetic signals. The RF circuitry 1080 includes well-known circuitry for performing these functions, including an antenna system, an RF transceiver, one or more amplifiers, a tuner, one or more oscillators, a digital signal processor, a CODEC chipset, a subscriber identity module (SIM) card, memory, and so forth. The RF circuitry 1080 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies that are known in the art.

The audio circuitry 1100, the speaker 1110, and the microphone 1130 provide an audio interface between a user and the consumer mobile phone 12. The audio circuitry 1100 receives audio data from the peripherals interface 1180, converts the audio data to an electrical signal, and transmits the electrical signal to the speaker 1110. The speaker 1110 converts the electrical signal to human-audible sound waves. The audio circuitry 1100 also receives electrical signals converted by the microphone 1130 from sound waves. The audio circuitry 1100 converts the electrical signal to audio data and transmits the audio data to the peripherals interface 1180 for processing. The audio circuitry 1100 also includes a headset jack serving as an interface between the audio circuitry 1100 and removable audio input/output peripherals, such as output-only headphones or a headset with both output (e.g., a headphone for one or both ears) and input (e.g., a microphone).

The I/O subsystem 1060 connects input/output peripherals on the consumer mobile phone 12, such as the touch screen 1120 and other input/control devices 1160, to the peripherals interface 1180. The I/O subsystem 1060 includes a display controller 1560 and one or more input controllers 1600 for other input or control devices. The one or more input controllers 1600 receive/send electrical signals from/to other input or control devices 1160. The other input/control devices 1160 may include physical buttons (e.g., push buttons, rocker buttons, etc.), dials, slider switches, joysticks, click wheels, and so forth all serving as forming part of an interface. The input controllers 1600 may be connected to any of the following: a keyboard, infrared port, USB port, and a pointer device such as a mouse. The one or more buttons may include an up/down button for volume control of the speaker 1110 and/or the microphone 1130. The one or more buttons may include a push button. A quick press of the push button may disengage a lock of the touch screen 1120 or begin a process that uses gestures on the touch screen to unlock the device. A longer press of the push button may turn power to the consumer mobile phone 12 on or off. The touch screen 1120 is used to implement virtual or soft buttons and one or more soft keyboards.

The touch-sensitive touch screen 1120 provides an input interface and an output interface between the device and a user. The display controller 1560 receives and/or sends electrical signals from/to the touch screen 1120. The touch screen 1120 displays visual output to the user. The visual output may include graphics, text, icons, video, and any combination thereof (collectively termed "graphics"). In some embodiments, some or all of the visual output may correspond to user-interface objects, further details of which are described below.

A touch screen 1120 has a touch-sensitive surface, sensor or set of sensors that accepts input from the user based on haptic and/or tactile contact. The touch screen 1120 and the display controller 1560 (along with any associated modules and/or sets of instructions in memory 1020) detect contact (and any movement or breaking of the contact) on the touch screen 1120 and converts the detected contact into interaction with user-interface objects (e.g., one or more soft keys, icons, web pages or images) that are displayed on the touch screen. In an exemplary embodiment, a point of contact between a touch screen 1120 and the user corresponds to a finger of the user.

The touch screen 1120 may use LCD (liquid crystal display) technology, or LPD (light emitting polymer display) technology, although other display technologies may be used in other embodiments. The touch screen 1120 and the display controller 1560 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touch screen 1120.

The user may make contact with the touch screen 1120 using any suitable object or appendage, such as a stylus, a finger, and so forth. In some embodiments, the user interface is designed to work primarily with finger-based contacts and gestures, which are much less precise than stylus-based input due to the larger area of contact of a finger on the touch screen. In some embodiments, the device translates the rough finger-based input into a precise pointer/cursor position or command for performing the actions desired by the user.

The consumer mobile phone 12 also includes a power system 1620 for powering the various components. The power system 1620 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

The software components stored in memory 1020 include an operating system 1260, a communication module (or set of instructions) 1280, a contact/motion module (or set of instructions) 1300, a graphics module (or set of instructions) 1320, a text input module (or set of instructions) 1340, and applications (or set of instructions) 1360.

The operating system 1260 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

The communication module 1280 facilitates communication with other devices over one or more external ports 1240 and also includes various software components for handling data received by the RF circuitry 1080 and/or the external port 1240. The external port 1240 (e.g., Universal Serial Bus (USB), FIREWIRE, etc.) is adapted for coupling directly to other devices or indirectly over a network (e.g., the Internet, wireless LAN, etc.).

The contact/motion module 1300 may detect contact with the touch screen 1120 (in conjunction with the display controller 1560) and other touch sensitive devices (e.g., a touchpad or physical click wheel). The contact/motion module 1300 includes various software components for performing various operations related to detection of contact, such as determining if contact has occurred, determining if there is movement of the contact and tracking the movement across the touch screen 1120, and determining if the contact has been broken (i.e., if the contact has ceased). Determining movement of the point of contact may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts).

The contact/motion module 1300 and the display controller 1560 also detects contact on a touchpad.

The graphics module 1320 includes various known software components for rendering and displaying graphics on the touch screen 1120, including components for changing the intensity of graphics that are displayed. As used herein, the term "graphics" includes any object that can be displayed to a user, including text, web pages, icons (such as user-interface objects including soft keys), digital images, videos, animations and the like.

The text input module 1340, which may be a component of graphics module 1320, provides soft keyboards for entering text in various applications (e.g., contacts, e-mail, IM, blogging, browser, and any other application that needs text input). The applications 1360 may include the mobile application 208.

Figure 9:
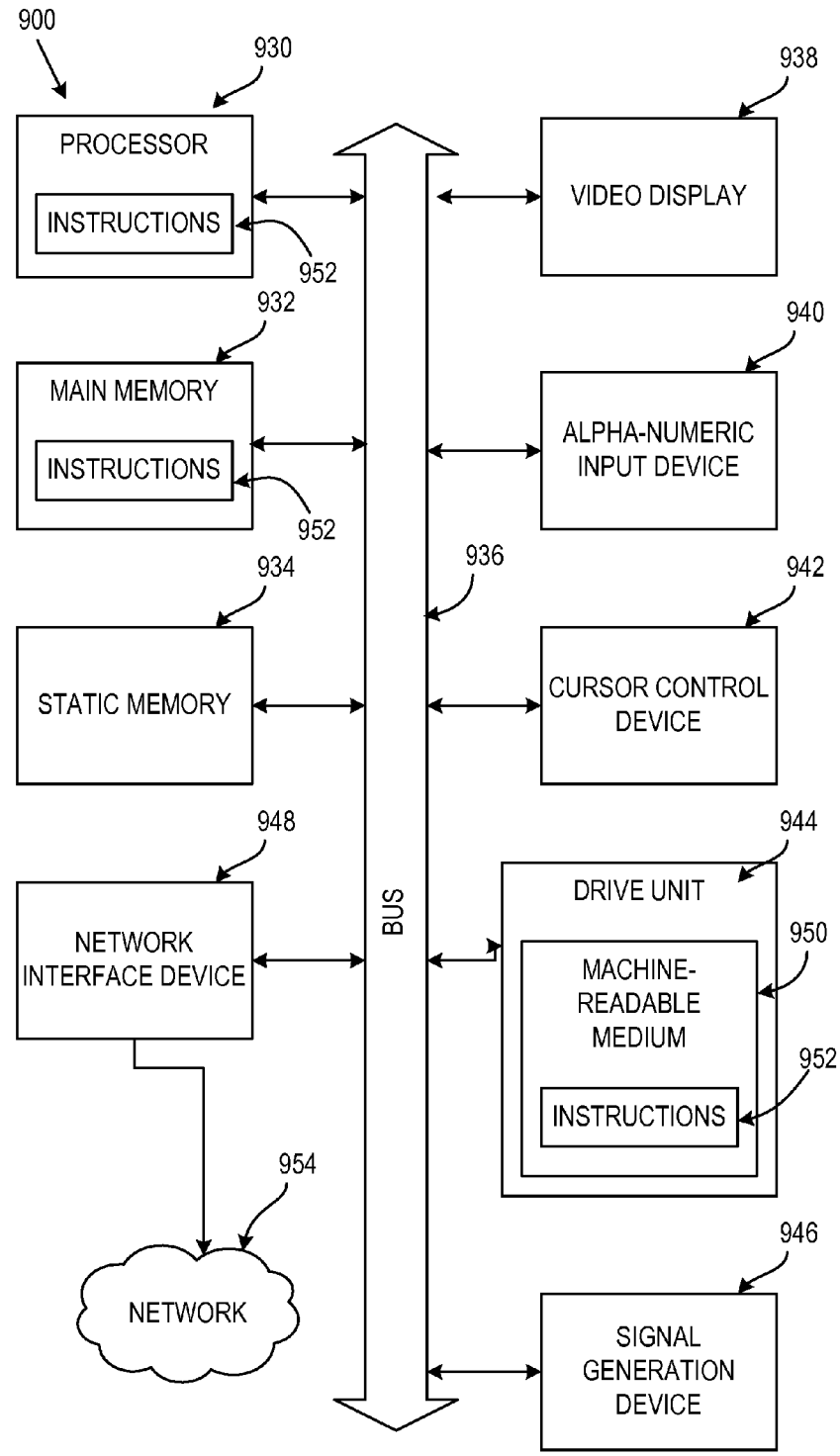
FIG. 9 is a block diagram of a machine in the form of a computer system forming part of the merchant managed subscription system.

FIG. 9 shows a diagrammatic representation of a machine in the exemplary form of a computer system 900 within which a set of instructions, for causing the machine to perform any one or more of the methodologies discussed herein, may be executed. In alternative embodiments, the machine operates as a standalone device or may be connected (e.g., networked) to other machines. In a network deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 900 includes a processor 930 (e.g., a central processing unit (CPU), a graphics processing unit (GPU), or both), a main memory 932 (e.g., read-only memory (ROM), flash memory, dynamic random access memory (DRAM) such as synchronous DRAM (SDRAM) or Rambus DRAM (RDRAM), etc.), and a static memory 934 (e.g., flash memory, static random access memory (SRAM, etc.), which communicate with each other via a bus 936.

The computer system 900 may further include a video display 938 (e.g., a liquid crystal displays (LCD) or a cathode ray tube (CRT)). The computer system 900 also includes an alpha-numeric input device 940 (e.g., a keyboard), a cursor control device 942 (e.g., a mouse), a disk drive unit 944, a signal generation device 946 (e.g., a speaker), and a network interface device 948.

The disk drive unit 944 includes a machine-readable medium 950 on which is stored one or more sets of instructions 952 (e.g., software) embodying any one or more of the methodologies or functions described herein. The software may also reside, completely or at least partially, within the main memory 932 and/or within the processor 930 during execution thereof by the computer system 900, the memory 932 and the processor 930 also constituting machine readable media. The software may further be transmitted or received over a network 954 via the network interface device 948.

While the instructions 952 are shown in an exemplary embodiment to be on a single medium, the term "machine-readable medium" should be taken to understand a single medium or multiple media (e.g., a centralized or distributed database or data source and/or associated caches and servers) that store the one or more sets of instructions. The term "machine-readable medium" shall also be taken to include any medium that is capable of storing, encoding, or carrying a set of instructions for execution by the machine and that cause the machine to perform any one or more of the methodologies of the present invention. The term "machine-readable medium" shall accordingly be taken to include, but not be limited to, solid-state memories and optical and magnetic media.

While certain exemplary embodiments have been described and shown in the accompanying drawings, it is to be understood that such embodiments are merely illustrative and not restrictive of the current invention, and that this invention is not restricted to the specific constructions and arrangements shown and described since modifications may occur to those ordinarily skilled in the art.

What is claimed:

1. A method of processing a charge comprising:
    receiving, with a billing server, a charge application programmable interface (API) call from a merchant server, including a mobile station international subscriber directory number (msisdn) and an amount;
    determining, with the billing server, a select carrier server from a plurality of carrier servers;
    determining, with the billing server, whether an opt-in is required;
    if an opt-in is not required then transmitting, with the billing server, a charge request to the select carrier server;
    if an opt-in is required then returning, with the billing server, a charge response to the merchant server;
    transmitting, with the billing server after transmitting the charge response, a text message to a consumer phone at the msisdn with opt-in instructions;
    receiving, with the billing server after transmitting the text message, an opt-in for the msisdn;
    transmitting, with the billing server after receiving the opt-in, a charge request to the select carrier server, including the msisdn and amount; and
    returning, with the billing server, a chargeresult callback notification to the merchant server, including an indication of acceptance or failure of the charge request.

2. The method of claim 1, wherein the charge API call is received at a uniform resource locator (URL) of the billing server.

3. The method of claim 1, wherein the charge API call includes a request-id supplied by the merchant server and the chargeresult includes the request-id.

4. The method of claim 1, wherein the charge API call with a merchant-id (billing server assigned merchant identifier (ID)), a consumer-ip-address (internet protocol (IP) address of the originating consumer), a service-id (merchant server offering ID), a country (country code), a currency (currency code), an item-description (description of the item being purchased), and a request-id (merchant server assigned request ID. Must be unique.).

5. The method of claim 1, wherein the select carrier server is detected from the charge API call that includes at least one of a name of a carrier, a mcc (mobile country code) and a mnc (mobile network code).

6. The method of claim 1, wherein the chargeresult callback notification includes a charge-id (billing server assigned charge ID, a result-code (the result of this request), a result-message (description of the result).

7. The method of claim 1, wherein the chargeresult callback notification is submitted to a uniform resource locator (URL) of the merchant server.

8. The method of claim 1, wherein the charge request includes a request-id and if the charge request fails, the method further comprising:
receiving, with the billing server, a charge API call from the merchant server with a new request-id such that the billing server does not return the same indication of failure of the charge request, a msisdn and an amount;
transmitting, with the billing server, a charge request to the select carrier server, including the msisdn and amount received in the charge API call with the new request-id; and
returning, with the billing server, a chargeresult callback notification to the merchant server, including an indication of acceptance or failure of the charge request based on the new request-id.

9. The method of claim 1,
the response to the merchant server in response to the charge API call indicating that a consumer opt-in in the form of a personal identification number (PIN) code is required
and the opt-in being a continue request received from the merchant server at the billing server, including a PIN code, further comprising:
validating, with the billing server, the PIN code received in the continue request against the PIN code transmitted in the text message, wherein the charge request to the carrier server is only transmitted after successful validation of the PIN code in the continue request.

10. The method of claim 1, the response to the merchant server in response to the charge API call indicating that a consumer opt-in in the form of a keyword is required and including the keyword;
and the opt-in being a text message from the consumer mobile phone at the billing server including a keyword, further comprising:
validating the keyword received in the text message against the keyword in the response to the merchant server, wherein the charge request to the carrier server is only transmitted after successful validation of the keyword in the text message.

11. The method of claim 1, further comprising:
receiving, with the billing server, a refund call from the merchant server;
determining, with the billing server, the select carrier server in response to the refund call;
transmitting, with the billing server, a refund request to the select carrier in response to the refund call from the merchant server, including an amount; and
transmitting, with the billing server, a chargeback notification to the merchant server in response to the refund call from the merchant server.

12. The method of claim 11, wherein the chargeresult callback notification has a charge-id and the refund call has the charge-id of the chargeresult callback notification.

13. The method of claim 11, further comprising:
determining, with the billing server, whether a valid reason code is included in the refund call, the refund request only being transmitted if a valid reason code is included in the refund call.

14. The method of claim 11, wherein the refund call includes a merchant-id (billing server assigned merchant identifier (ID)), a charge-id (charge ID of the payment to refund), a reason-code (billing server reason code), and a request-id (merchant server assigned request ID).

15. The method of claim 11, wherein the chargeback notification includes a refund-id (identifier (ID) of the billing server created refund transaction), a result-code (the result of this request), and a result-message (description of the result).

16. A non-transitory computer-readable medium having stored thereon a set of instructions which, when executed by a processor of a computer performs a method of processing a charge comprising:
receiving, with a billing server, a charge application programmable interface (API) call from a merchant server, including a mobile station international subscriber directory number (msisdn) and an amount;
determining, with the billing server, a select carrier server from a plurality of carrier servers;
determining, with the billing server, whether an opt-in is required;
if an opt-in is not required then transmitting, with the billing server, a charge request to the select carrier server;
if an opt-in is required then returning, with the billing server, a charge response to the merchant server;
transmitting, with the billing server after transmitting the charge response, a text message to a consumer phone at the msisdn with opt-in instructions;
receiving, with the billing server after transmitting the text message, an opt-in for the msisdn;
transmitting, with the billing server after receiving the opt-in, a charge request to the select carrier server, including the msisdn and amount; and
returning, with the billing server, a chargeresult callback notification to the merchant server, including an indication of acceptance or failure of the charge request.

17. A billing computer system comprising:
a processor;
a computer-readable medium connected to the processor; and
a set of instructions on the computer-readable medium, including:
a carrier billing module, executable with the processor, to receive a charge application programmable interface (API) call from a merchant server, including a msisdn and an amount, to determine a select carrier server from a plurality of carrier servers, to determine whether an opt-in is required, if an opt-in is not required then to transmit a charge request to the select carrier server, if an opt-in is required then to return a charge response to the merchant server, to transmit, after transmitting the charge response, a text message to a consumer phone at the msisdn with opt-in instructions, to receive, after transmitting the text message, an opt-in for the msisdn, to transmit, after receiving the opt-in, a charge request to the select carrier server, including the msisdn and amount, and to return a chargeresult callback notification to the merchant server, including an indication of acceptance or failure of the charge request.

18. The billing computer system of claim 17, the set of instructions further including:
an opt-in management module storing consumer opt-ins;
an short message server (SMS) messaging module connected to the opt-in management module, the carrier billing module returning a response to the merchant server in response to the charge API call indicating that a consumer opt-in in the form of a personal identification number (PIN) code is required, the SMS messaging module transmitting a text message to a consumer mobile phone at the msisdn, the carrier billing module receiving a continue request from the merchant server, including a PIN code and validating the PIN code received in the continue request against the PIN code transmitted in the text message, wherein the charge request to the carrier server is only transmitted after successful validation of the PIN code in the continue request.

19. The billing computer system of claim 17, the set of instructions further including:
an opt-in management module;
an short message server (SMS) messaging module connected to the opt-in management module, the carrier billing module returning a response to the merchant server in response to the charge API call indicating that a consumer opt-in in the form of a keyword is required and including the keyword, the SMS messaging module transmitting a text message to a consumer mobile phone at the msisdn, the text message indicating that a response in the form of a keyword is required and receiving a text message from the consumer mobile phone, including the text message, the carrier billing module validating the keyword received in the text message against the keyword in the response to the merchant server, wherein the charge request to the carrier server is only transmitted after successful validation of the keyword in the text message.

20. The billing computer system of claim 17, further comprising:
a carrier refund module receiving a refund call from the merchant server, determining the select carrier server in response to the refund call, transmitting a refund request to the select carrier in response to the refund call from the merchant server, including an amount and transmitting a chargeback notification to the merchant server in response to the refund call from the merchant server.

* * * * *